(12) United States Patent
Liu

(10) Patent No.: US 7,194,948 B2
(45) Date of Patent: Mar. 27, 2007

(54) SECONDARY PUMP OF BRAKE

(76) Inventor: Lai-Chen Liu, No. 1, Alley 10, Lane 291, Yongfeng Road, Taichung Hsien, Taiping City (TW)

( * ) Notice: Subject to any disclaimer, the term of this patent is extended or adjusted under 35 U.S.C. 154(b) by 24 days.

(21) Appl. No.: 11/160,546

(22) Filed: Jun. 28, 2005

(65) Prior Publication Data

US 2006/0288861 A1 Dec. 28, 2006

(51) Int. Cl.
*F15B 13/04* (2006.01)
*B23P 19/04* (2006.01)

(52) U.S. Cl. .......................................... 91/454; 29/239
(58) Field of Classification Search .................. 91/454; 29/239

See application file for complete search history.

(56) References Cited

U.S. PATENT DOCUMENTS

| | | | | |
|---|---|---|---|---|
| 3,208,353 A | * | 9/1965 | Wandel | 91/454 |
| 5,003,681 A | * | 4/1991 | Schley | 29/239 |
| 5,018,261 A | * | 5/1991 | Markous | 29/239 |
| 5,678,293 A | * | 10/1997 | Sturdevant | 29/239 |
| 6,134,764 A | * | 10/2000 | Rivera | 29/239 |
| 6,195,863 B1 | * | 3/2001 | Blake | 29/239 |
| 6,678,931 B1 | * | 1/2004 | Tatasciore | 29/239 |

* cited by examiner

*Primary Examiner*—Thomas E. Lazo
(74) *Attorney, Agent, or Firm*—Alan D. Kamrath; Nikolai & Mersereau, P.A.

(57) ABSTRACT

An adjustor for a secondary pump of a brake includes a stationary plate attached to the secondary pump, a cylinder attached to the stationary plate, a piston movable in the cylinder, a rod extended through the cylinder and connected to the piston, a handle connected to the cylinder, an inlet valve put on the handle, and an outlet valve put on the handle. Pressurized air can enter the cylinder through the handle and drive the piston and hence the rod while going in the cylinder. The inlet valve controls the inlet of the pressurized air into the cylinder through the cylinder handle. The outlet valve controls the release of the pressurized air from the cylinder through the handle.

18 Claims, 10 Drawing Sheets

SECONDARY PUMP OF BRAKE

BACKGROUND OF INVENTION

1. Field of Invention

The present invention relates to a secondary pump for a brake and, more particularly, to an adjustor for a secondary pump of a brake.

2. Related Prior Art

A brake system of a car includes a brake pedal, a primary pump, four secondary pumps and four brakes. As the brake pedal is trodden, the primary pump is actuated. The primary pump transfers pressurized liquid to the secondary pumps. The secondary pumps actuate the brakes in order to stop the wheels of the car. Each brake includes a drum or disc and two brake shoes for rubbing against and stopping the drum or disc. This wears away the brake shoes so that the gaps between the drum or disc and the brake shoes get larger. The secondary pumps extend more in order to compensate the larger gaps. When the brake shoes are too thin for normal operation, they must be replaced with new ones. The secondary pumps must be pushed back to their original positions before such replacement can be conducted. Adjustors are used to this end.

Referring to FIGS. 1 and 2, a conventional adjustor includes a stationary plate 2, a dextrorotary threaded nut 3 or a levorotary threaded nut 3a attached to the stationary plate 2, a dextrorotary threaded bolt 1 or a levorotary threaded bolt 1a engaged with the dextrorotary threaded nut 3 or a levorotary threaded nut 3a, a pusher 4 for pushing a secondary pump 6, and a handle 5 operable in order to rotate the threaded bolt 1 or 1a. It is, however, exhausting to rotate the threaded bolt 1 or 1a. Moreover, it is inconvenient to keep both of the threaded bolts 1 and 1a, since the dextrorotary threaded nuts 3 are used in some cars, and the levorotary threaded nuts 3a are used in other cars.

Referring to FIG. 3, another conventional adjustor includes a stationary plate 11, a cylinder 10 attached to the stationary plate 11, a joint 16 connected to the cylinder 10, a lever 15 connected to the joint 16, a rod 12 extended through the cylinder 10 and connected to a piston (not shown) in the cylinder 10, a handle 14 operable in order to pull the rod 12, and a pusher 13 for contacting a secondary pump. The joint 16 can be connected to a pipe (not shown) that leads to a compressor (not shown). Pressured liquid can be transferred into the cylinder 10 in order to drive the piston and hence the rod 12. Since the cylinder 10 is not equipped with any release device, the pipe must be disengaged from the joint 16 before the handle 14 can be operated in order to pull the rod 12 back to its original position. This is, however, inconvenient.

The present invention is therefore intended to obviate or at least alleviate the problems encountered in the prior art.

SUMMARY OF INVENTION

According to the present invention, there is disclosed an adjustor for a secondary pump of a brake. The adjustor includes a stationary plate attached to the secondary pump, a cylinder attached to the stationary plate, a piston movable in the cylinder, a rod extended through the cylinder and connected to the piston, a handle connected to the cylinder, an inlet valve put on the handle, and an outlet valve put on the handle. Pressurized air can enter the cylinder through the handle and drive the piston and hence the rod while going in the cylinder. The inlet valve controls the inlet of the pressurized air into the cylinder through the cylinder handle. The outlet valve controls the release of the pressurized air from the cylinder through the handle.

An advantage of the adjustor according to the present invention is that the outlet valve enables easy release of the pressurized air from the cylinder through the handle.

Another advantage of the adjustor according to the present invention is the handle facilitates the handling of the adjustor.

Other advantages and novel features of the invention will become more apparent from the following detailed description in conjunction with the drawings.

BRIEF DESCRIPTION OF DRAWINGS

The present invention will be described through detailed description of the preferred embodiment referring to the drawings.

DETAILED DESCRIPTION OF PREFERRED EMBODIMENT

Figure 1:
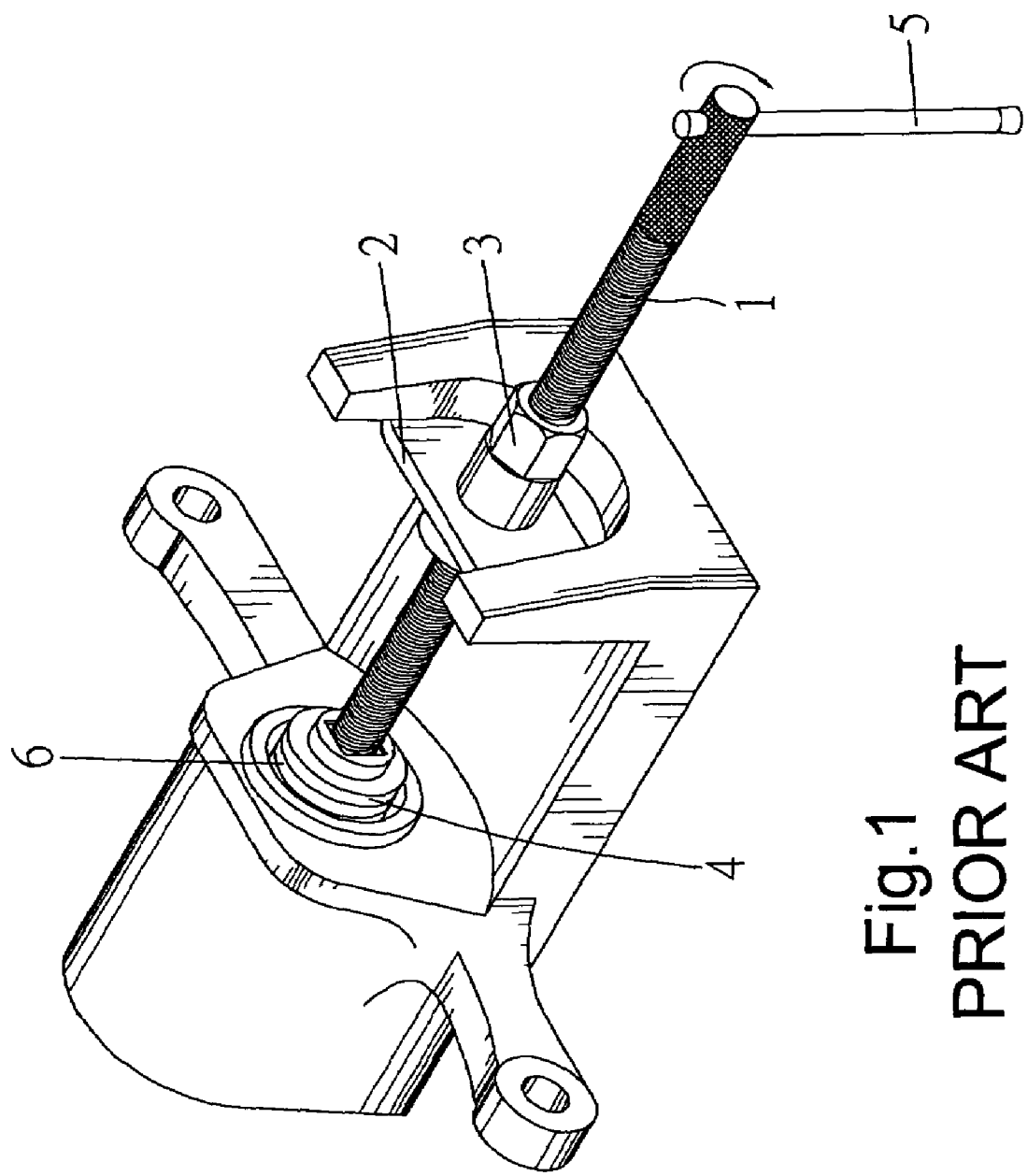
FIG. 1 is a perspective view of a conventional adjustor for a secondary pump of a brake.
Figure 2:
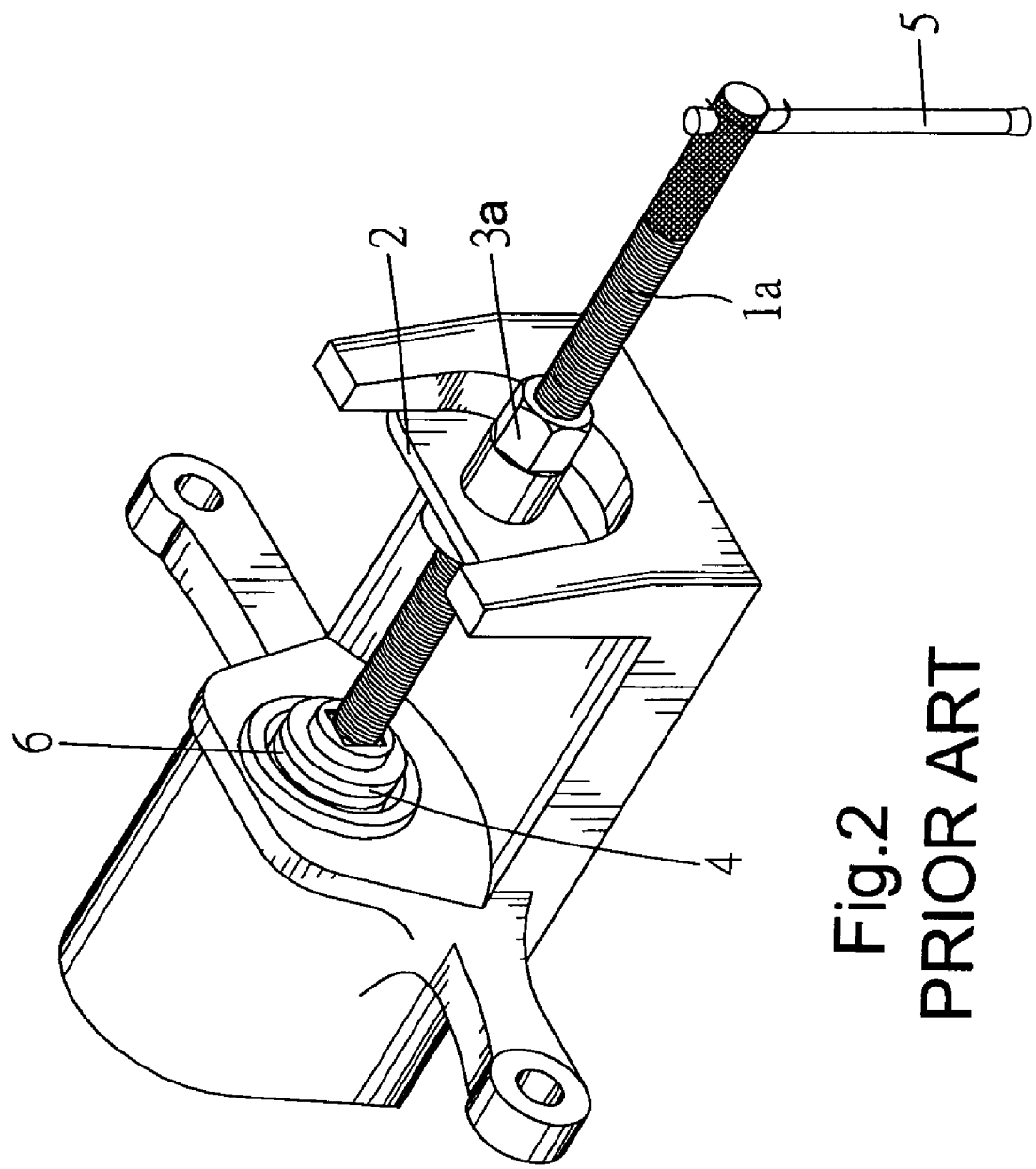
FIG. 2 is a perspective view of another conventional adjustor for a secondary pump of a brake.
Figure 3:
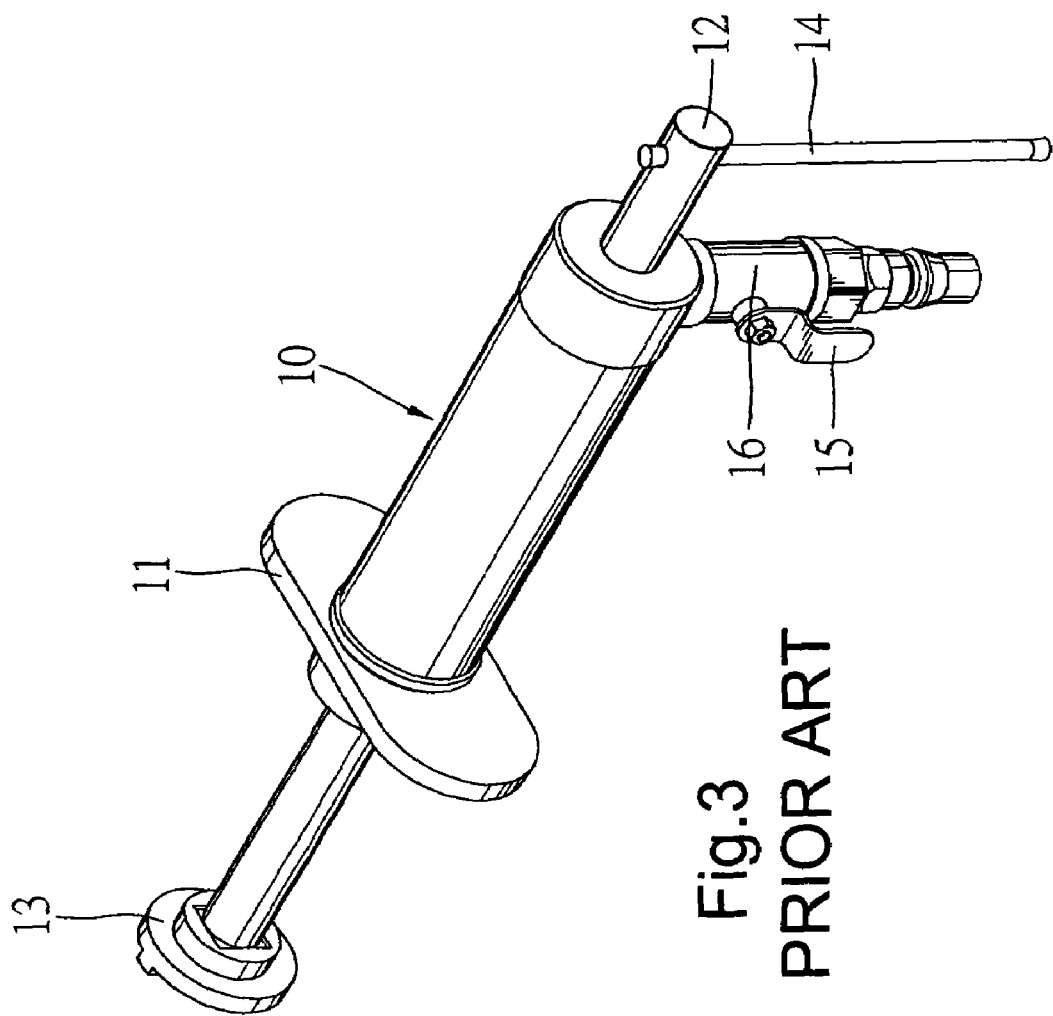
FIG. 3 is a perspective view of still another conventional adjustor for a secondary pump of a brake.
Figure 4:
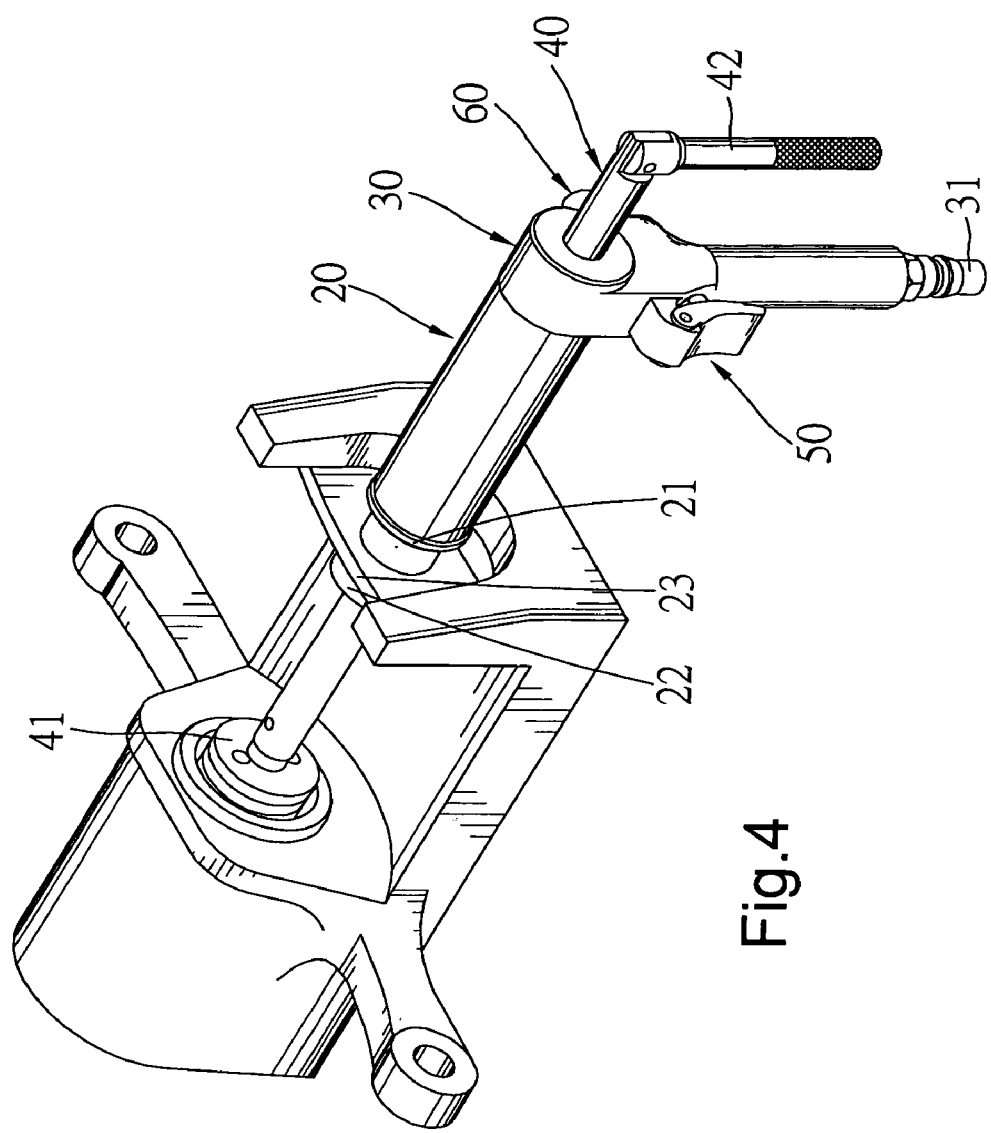
FIG. 4 is a perspective view of an adjustor for a secondary pump of a brake according to the preferred embodiment of the present invention.

Referring to FIG. 4, there is shown an adjustor for a secondary pump of a brake. The adjustor includes a stationary plate 23 attached to a secondary pump, a cylinder 20 attached to the stationary plate 23, a handle 30 connected to the cylinder 20, a rod 40 extended through and connected to a piston 25 (FIG. 5) in the cylinder 20, an inlet valve 50 put on a side of the handle 30, and an outlet valve 60 put on an opposite side of the handle 30.

Figure 5:
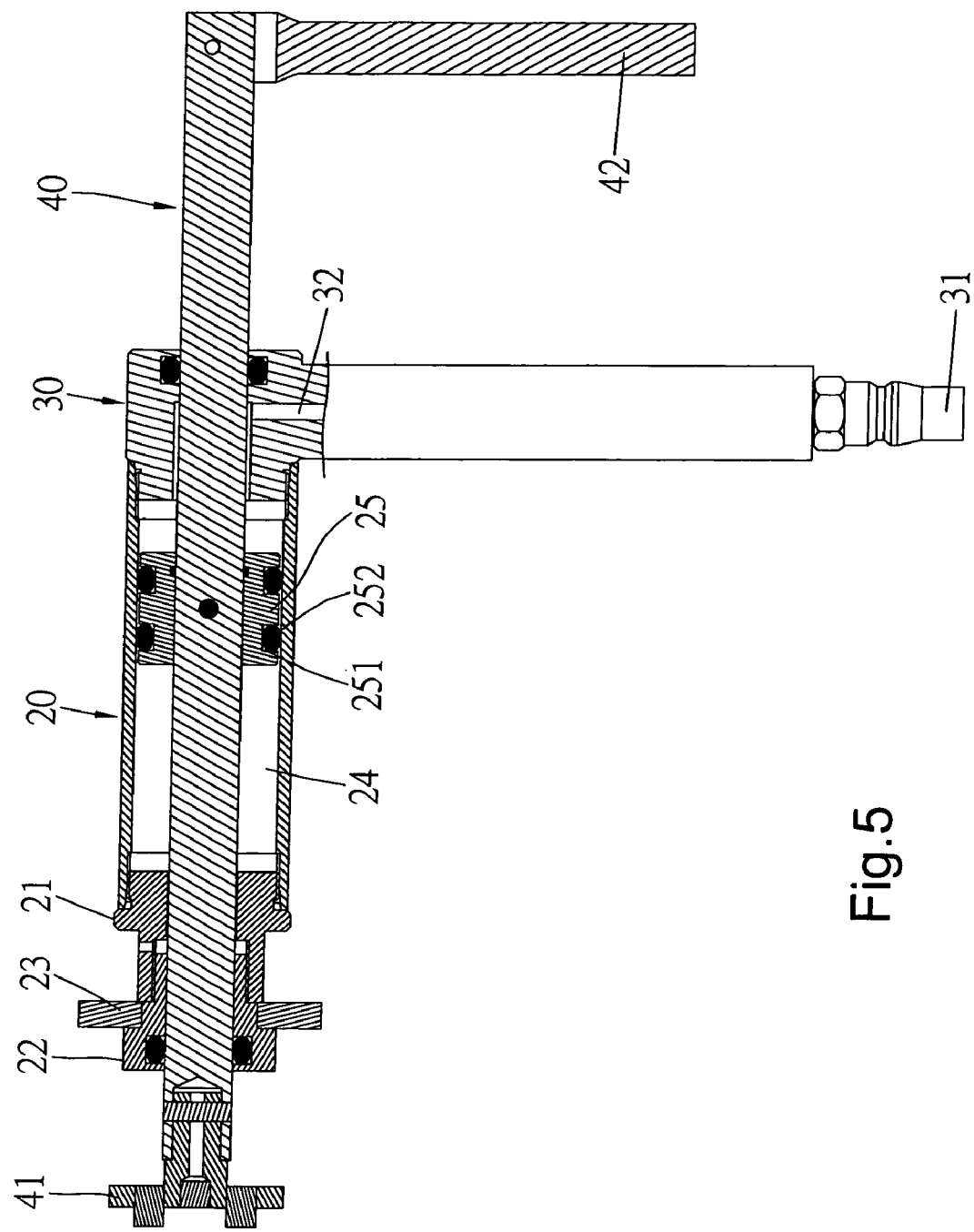
FIG. 5 is a cross-sectional view of the adjustor shown in FIG. 4.

The cylinder 20 is attached to the stationary plate 23 by two fasteners 21 and 22 (FIG. 5). At an end of the handle 30 is formed a joint 31 for connection to a pipe (not shown) leading to an air compressor (not shown). Thus, pressurized air can enter the cylinder 20 through the handle 30. While going in the cylinder 20, the pressurized air drives the piston 25 and, hence, the rod 40 in order to push the secondary pump. A pusher 41 is attached to an end of the rod 40 for contact with the secondary pump. A handle 42 is attached to the other end of the rod 40. The inlet valve 50 controls the inlet of the pressurized air into the cylinder 20 through the cylinder handle 30. The outlet valve 60 controls the outlet of the pressurized air from the cylinder 20 through the cylinder handle 30. After the pressurized air is released from the cylinder 20, the handle 42 can be operated in order to pull the rod 40.

Referring to FIG. 5, the cylinder 20 defines a space 24 for receiving the piston 25 and the rod 40. The piston 25 defines two grooves 251 in the periphery thereof for receiving two piston rings 252. The rod 40 is inserted through the piston 25. The rod 40 is connected to the piston 25 by a pin (not numbered).

Figure 6:
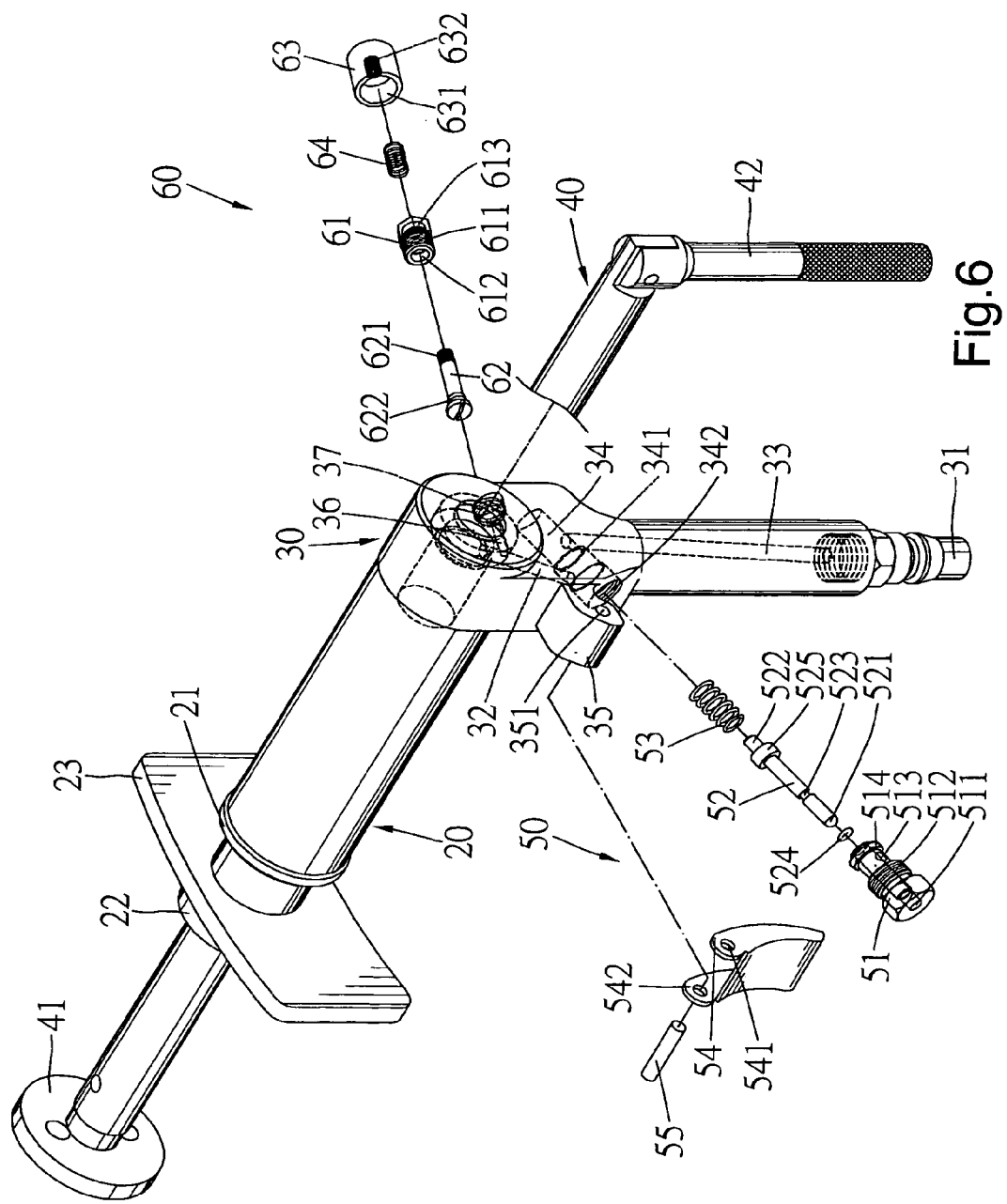
FIG. 6 is an exploded view of the adjustor shown in FIG. 4.
Figure 7:
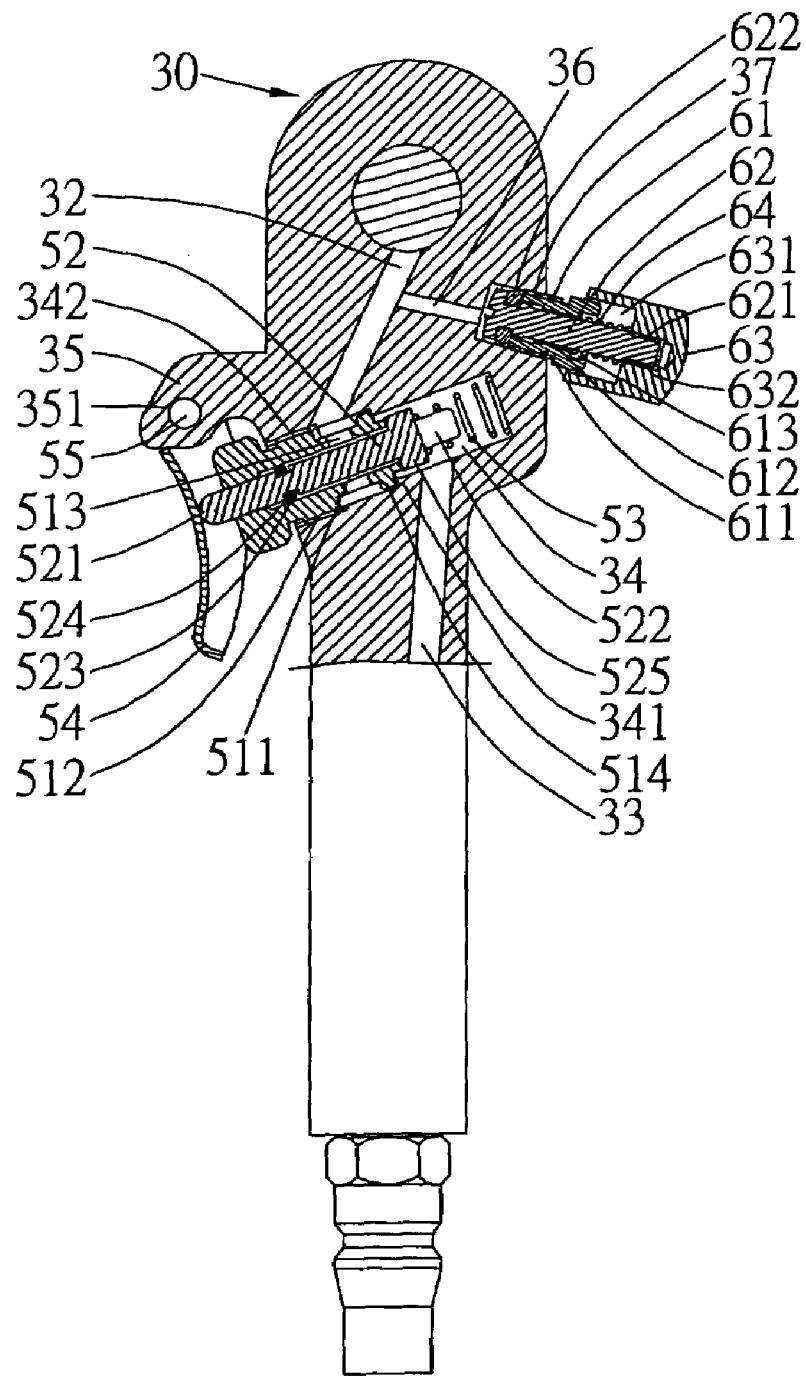
FIG. 7 is a cross-sectional view of the adjustor shown in FIG. 4.

Referring to FIGS. 6 and 7, the handle 30 defines a channel 32 communicated with the space 24, a space 34 communicated with the channel 32, a channel 33 communicated with the space 34, a channel 36 communicated with the channel 32, and a space 37 communicated with the channel 36. The space 34 includes two sections, thus forming a shoulder 341 between the sections. A thread 342 is formed on the wall of external one of the sections of the space 34. On the handle 30 is formed an ear 35 near the space 34. The ear 35 defines an aperture 351.

The inlet valve 50 is put substantially in the space 34. The inlet valve 50 includes a housing 51, a core 52, a spring 53, and a lever 54. The housing 51 includes a thread 512 and a flange 514 formed thereon. The thread 512 is engaged with the thread 342 in order to attach the inlet valve 50 to the handle 30. The flange 514 is put against the shoulder 341. The housing 51 defines a longitudinal channel 511 and a transverse channel 513 communicated with the longitudinal channel 511.

The core 52 includes a first round end 521, a second round end 522, a groove 523 defined therein near the first end 521 and a flange 525 formed thereon near the second end 522. A seal 524 is put in the groove 523. The core 52 is inserted through the longitudinal channel 511. The first end 521 is exposed from a first end of the housing 51. The second end 522 and the flange 525 are exposed from an opposite second end of the housing 51.

The spring 53 is put in the internal section of the space 34. The spring 53 is compressed between a closed end of the space 34 and the flange 525 in order to push the flange 525 towards the second end of the housing 51.

The lever 54 includes two ears 542 each defining an aperture 541. A pin 55 is fit in the aperture 351 and 541 in order to attach the lever 54 to the ear 35. The lever 54 is put against the first end 521 of the core 52. The lever 54 can be operated in order to push the core 52.

The outlet valve 60 is put substantially in the space 37. The outlet valve 60 includes a housing 61, a core 62, a spring 64, and a button 63. On the housing 61 is formed a thread 611 engaged with a thread (not numbered) formed on the wall of the space 37 in order to attach the housing 61 to the handle 30. The housing 61 defines a recess 613 defined in a first end thereof and a longitudinal channel 612 defined in an opposite second end thereof.

The core 62 includes a first end and an enlarged second end opposite to the first end. A thread 621 is formed on the core 62 near the first end. A seal 622 is put on the core 62 against the enlarged second end. The core 62 is inserted through the housing 61. The thread 621 is exposed from the first end of the housing 61. The seal 622 is exposed from the second end of the housing 61.

The spring 64 is put on the core 62 and in the recess 613.

The button 63 defines a space 631 and a screw hole 632. The screw hole 632 receives the thread 621 in order to attach the button 63 to the core 62. The spring 64 is compressed between the button 63 and the housing 61 in order to push the button 63 from the first end of the housing 61. Thus, the seal 622 is pulled towards the second end of the housing 61.

Figure 8:
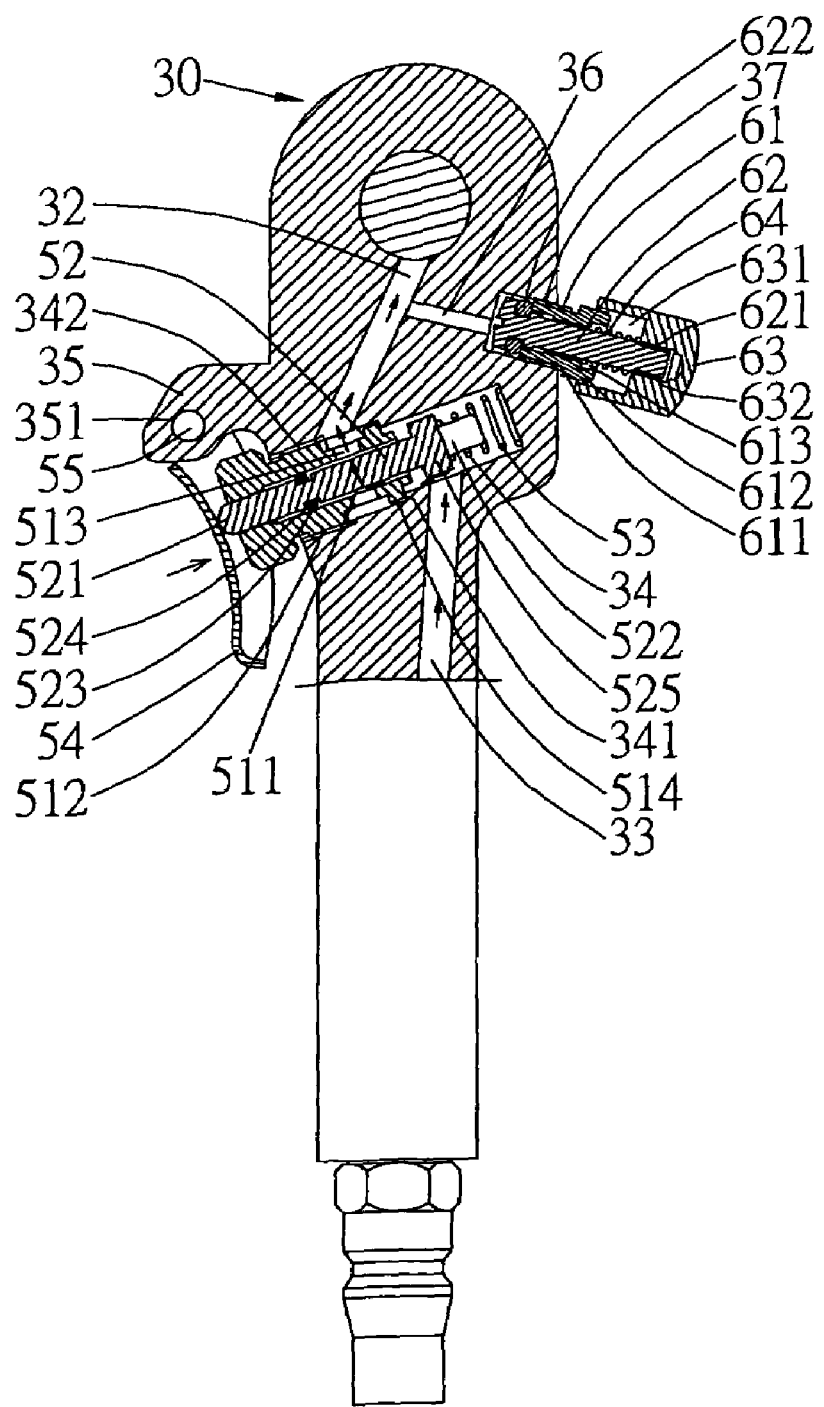
FIG. 8 is similar to FIG. 7 but shows the adjustor in another position.

Referring to FIG. 8, the lever 54 is operated. The core 52 is pushed against the spring 53. The flange 525 is moved from the second end of the housing 51. Thus, the pressurized air can go through the channel 33, the internal section of the space 34, the longitudinal channel 511, the transverse channel 513, and the channel 32.

Figure 9:
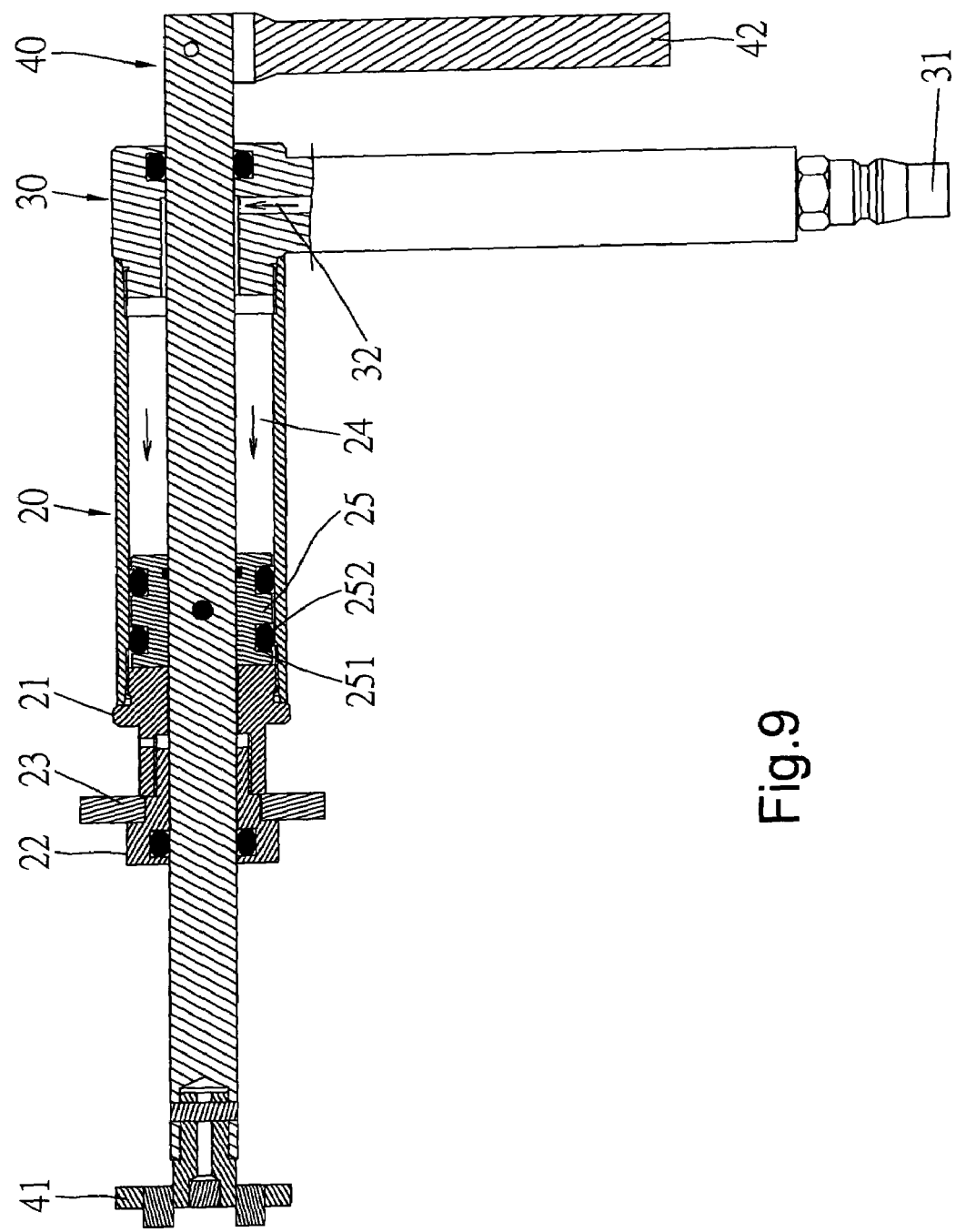
FIG. 9 is a cross-sectional view of the adjustor shown in FIG. 8.

Referring to FIG. 9, the pressurized air can go into the space 24 from the channel 32. While going in the space 24, the pressurized air drives the piston 25 and hence, the rod 40 in order to push the secondary pump.

Figure 10:
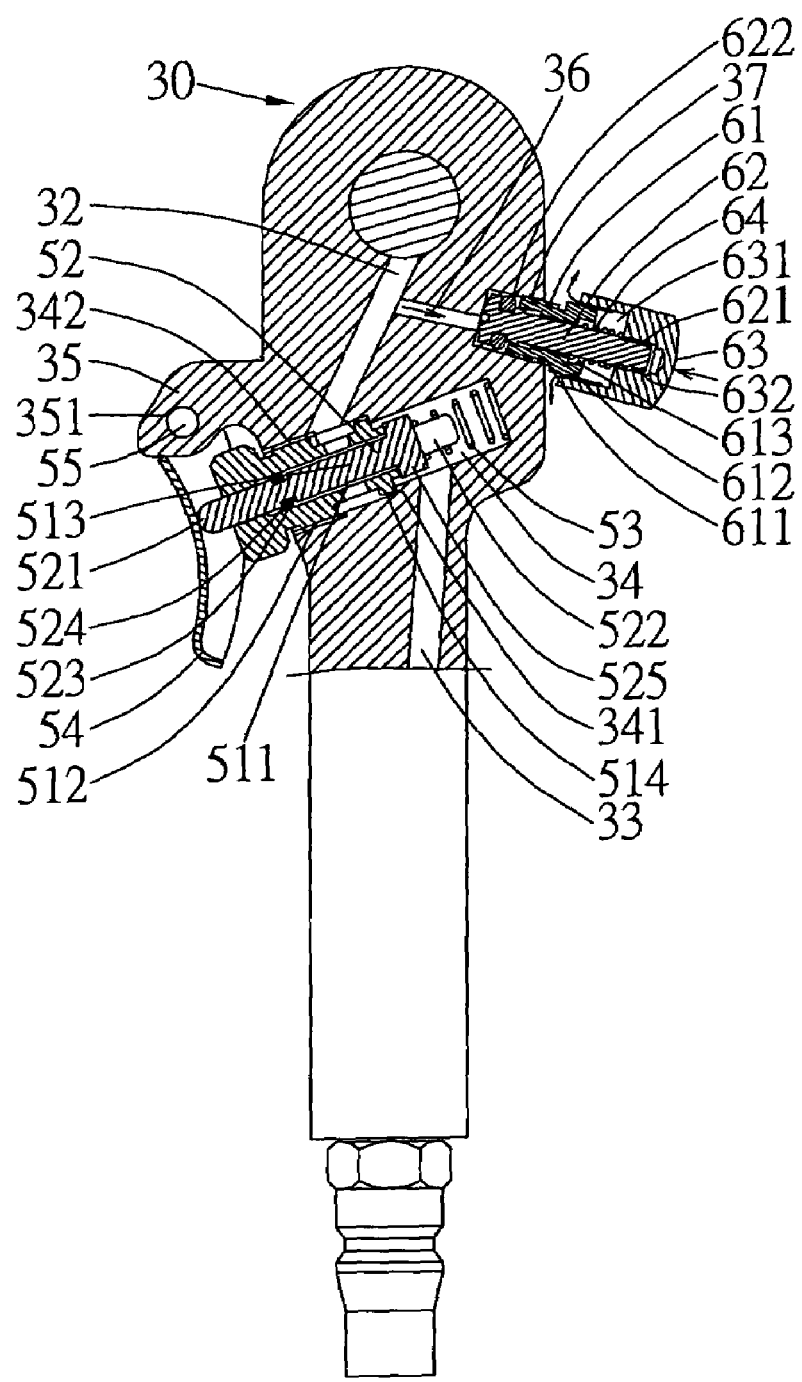
FIG. 10 is similar to FIG. 8 but shows the adjustor in another position.

Referring to FIG. 10, the button 63 is pressed. The core 62 is pushed against the spring 64. The seal 622 is moved from the second end of the housing 61. Thus, the pressurized air can go through the channel 32, the space 34, and the channel 612. Thus, the pressurized air is released from the cylinder 20 through the handle 30. Now, the handle 42 can be operated in order to pull the rod 40.

The adjustor according to the present invention is advantageous in several aspects. Firstly, the outlet valve 60 enables easy release of the pressurized air from the cylinder 20 through the handle 30. Secondly, the handle 30 facilitates the handling of the adjustor.

The present invention has been described through the detailed illustration of the preferred embodiment. Those skilled in the art can derive variations from the preferred embodiment without departing from the scope of the present invention. Therefore, the preferred embodiment shall not limit the scope of the present invention defined in the claims.

What is claimed is:

1. An adjustor for a secondary pump of a brake, the adjustor comprising:
   a stationary plate attached to the secondary pump;
   a cylinder attached to the stationary plate;
   a piston movable in the cylinder, wherein the cylinder defines a space for containing the piston;
   a rod extended through the cylinder and connected to the piston;
   a handle connected to the cylinder so that pressurized air can enter the cylinder through the handle and drive the piston and hence the rod while going in the cylinder;
   an inlet valve put on the handle in order to control the inlet of the pressurized air into the cylinder through the cylinder handle; and
   an outlet valve put on the handle in order to control the release of the pressurized air from the cylinder through the cylinder handle, wherein the handle comprises a first channel communicated with the space of the cylinder, a first space communicated with the first channel in order to contain the inlet valve, a second channel communicated with the first space on one hand and for communication with an air compressor on the other hand, a third channel communicated with the first channel, and a second space communicated with the third channel in order to contain the outlet valve.

2. The adjustor according to claim 1 wherein the inlet valve comprises:
   a housing fit in the first space, the housing comprising a first end, a second end, a shoulder formed thereon in order divide the first space into a first section and a second section, a longitudinal channel communicated with the second section of the first space, and a transverse channel communicated with the longitudinal channel on one hand and communicated with the first section of the first space on the other hand;
   a core movably extended through the housing, the core comprising a flange formed thereon in order to block the longitudinal channel from the first end; and
   a spring compressed between a closed end of the space and the flange of the core in order to push the flange of the core towards the second end of the housing.

3. The adjustor according to claim 2 wherein the core comprises an external end exposed from the first end of the housing so that the core can be pushed by the external end.

4. The adjustor according to claim 2 wherein the core comprises an internal end exposed from the second end of the housing and inserted in the spring.

5. The adjustor according to claim 3 wherein the inlet valve comprises a lever connected to the handle and put against the external end of the core so that the lever is operable in order to push the core by the external end.

6. The adjustor according to claim 5 wherein the handle comprises an ear formed thereon, wherein the lever comprises two ears connected to the ear of the handle.

7. The adjustor according to claim 2 wherein the inlet valve comprises a seal put around the core in order to seal the longitudinal channel near the first end.

8. The adjustor according to claim 7 wherein the core defines a groove for receiving the seal.

9. The adjustor according to claim 2 wherein the handle comprises a thread formed on the wall of the first section of the first space, wherein the housing comprises a thread engaged with thread of the handle in order to attach the inlet valve to the handle.

10. The adjustor according to claim 2 wherein the outlet valve comprises:
  a housing fit in the second space of the handle, the housing comprising a first end, a second end, and a longitudinal channel defined therein;
  a core movably extended through the housing, the core comprises an enlarged internal end for blocking the longitudinal channel from the second end; and
  a spring for moving the enlarged internal end of the core towards the second end of the housing.

11. The adjustor according to claim 10 wherein the core comprises an external end exposed from the first end of the housing in order to be operated.

12. The adjustor according to claim 11 wherein the outlet valve comprises a button connected to the external end of the core, wherein the spring is compressed between the button and the first end of the housing.

13. The adjustor according to claim 12 wherein the core comprises a thread formed thereon an end opposite to the enlarged internal end, wherein the button defines a screw hole in order to receive the thread of the core so as to attach the button to the core.

14. The adjustor according to claim 10 wherein the housing comprises a recess defined in the first end thereof in order to receive the spring.

15. The adjustor according to claim 10 wherein the outlet valve comprises a seal put around the core against the enlarged internal end.

16. The adjustor according to claim 1 wherein the handle comprises a joint formed thereon for connection to a pipe leading to the air compressor.

17. The adjustor according to claim 1 comprising a pusher attached to the rod for contact with the secondary pump.

18. The adjustor according to claim 1 comprising a handle attached to the rod in order to facilitate pulling the rod after the pressurized air is released from the cylinder.

* * * * *